UNITED STATES PATENT OFFICE.

THOMAS TREBELL, OF LIMEHOUSE, COUNTY OF MIDDLESEX, ENGLAND.

PAINT FOR SHIPS' BOTTOMS AND OTHER SUBMERGED STRUCTURES.

SPECIFICATION forming part of Letters Patent No. 249,424, dated November 8, 1881.

Application filed June 28, 1881. (No specimens.)

*To all whom it may concern:*

Be it known that I, THOMAS TREBELL, of Limehouse, in the county of Middlesex, England, have invented a new and Improved Paint for Ships' Bottoms and other Submerged Structures, of which the following is a specification.

The object of this invention is to prevent the fouling of ships' bottoms and preserve submerged structures from being injured by the water or other cause.

The invention consists in the paint composed of the following ingredients, compounded substantially in the manner and in the proportions specified.

In preparing my improved paint or composition I take one hundred pounds of rosin-oil, one hundred pounds of black-lead, fifty pounds of French chalk, fifty pounds of white zinc or oxide of zinc, seventy-five pounds of oxide of iron, red vermilion, or other coloring-body, and twenty-five pounds of tallow. These ingredients are thoroughly mixed, and can be ground in any ordinary paint-mill or with stones. I then heat together one hundred and twenty-five pounds of thick turpentine or Venice turpentine, fifty pounds of linseed-oil, (raw or boiled,) one hundred and twenty-five pounds of common rosin, (either light or dark,) twenty-five pounds of Gallipoli oil, and one hundred and twenty-five pounds of tallow or other fatty matter, and when the mixture is cold I mix with it twenty-five pounds of shellac dissolved in fifty pounds of alcohol, naphtha, or methylated spirit. I then add to the mixture fifty pounds of Venetian red or other coloring-matter, one hundred pounds of red or white lead, and one hundred and twenty-five pounds of zinc-paint, and thoroughly mix the ingredients. I then add to the mixture fifty pounds of tar-spirit and again thoroughly stir the mixture. The two compositions thus formed are then thoroughly mixed, and the paint is ready for use or market.

I have given herein the proportions of the various ingredients that I consider the best in practical use; but the quantity of any or all of the said ingredients can be varied without departing from my invention.

Having thus fully described my invention, I claim as new and desire to secure by Letters Patent—

The herein-described paint for the bottoms of ships and other submerged structures, consisting of rosin-oil, black-lead, French chalk, white zinc, oxide of iron, and tallow, mixed with turpentine, linseed-oil, rosin, Gallipoli oil, tallow, shellac dissolved in alcohol, Venetian red, red lead, zinc-paint, and tar-spirit, in substantially the proportions specified.

THOMAS TREBELL.

Witnesses:
JAMES T. GRAHAM,
C. SEDGWICK.